(12) United States Patent
Lee

(10) Patent No.: US 7,118,125 B2
(45) Date of Patent: Oct. 10, 2006

(54) HORN SWITCH ASSEMBLY FOR VEHICLES

(75) Inventor: You Sun Lee, Kyunggi-do (KR)

(73) Assignee: Hyundai Mobis Co., Ltd., Kyunggi-do (KR)

( * ) Notice: Subject to any disclaimer, the term of this patent is extended or adjusted under 35 U.S.C. 154(b) by 290 days.

(21) Appl. No.: 10/650,751

(22) Filed: Aug. 29, 2003

(65) Prior Publication Data
US 2005/0116452 A1 Jun. 2, 2005

(30) Foreign Application Priority Data
Aug. 14, 2003 (KR) ............... 10-2003-0056457

(51) Int. Cl.
*B60R 21/16* (2006.01)
(52) U.S. Cl. ............... 280/731; 280/728.2; 200/61.55
(58) Field of Classification Search ............... 280/731, 280/728.2; 200/61.54, 61.55; B60R 21/16, B60R 21/20
See application file for complete search history.

(56) References Cited

U.S. PATENT DOCUMENTS

| | | | | |
|---|---|---|---|---|
| 5,333,897 A | * | 8/1994 | Landis et al. ............ | 280/728.2 |
| 5,931,492 A | * | 8/1999 | Mueller et al. .......... | 280/728.2 |
| 5,934,702 A | * | 8/1999 | Coleman ................. | 280/731 |
| 6,196,573 B1 | * | 3/2001 | Worrell et al. ........... | 280/728.2 |
| 6,474,682 B1 | * | 11/2002 | Ikeda et al. ............. | 280/731 |
| 6,572,138 B1 | * | 6/2003 | Bohn et al. ............. | 280/731 |
| 6,682,092 B1 | * | 1/2004 | Schutz et al. ........... | 280/731 |
| 6,688,637 B1 | * | 2/2004 | Igawa et al. ............ | 280/728.2 |
| 6,719,323 B1 | * | 4/2004 | Kai et al. ............... | 280/731 |

* cited by examiner

*Primary Examiner*—Paul N. Dickson
*Assistant Examiner*—Drew J. Brown
(74) *Attorney, Agent, or Firm*—Greenblum & Bernstein, P.L.C.

(57) ABSTRACT

Disclosed herein is a horn switch assembly for vehicles. The horn switch assembly comprising studs, elastic members, a horn plate, a movable switch terminal, and a stationary switch terminal, is disposed between an airbag housing mounted in a steering wheel and an airbag cover vertically slidably attached to the airbag housing. Each of the elastic members has a relatively small spring constant since the elastic members of the horn switch assembly support only the airbag cover formed of a plastic material easily broken when an airbag is expanded, whereby the elastic members and the studs are miniaturized, and the force necessary to manipulate the horn switch assembly is reduced.

10 Claims, 4 Drawing Sheets

HORN SWITCH ASSEMBLY FOR VEHICLES

BACKGROUND OF THE INVENTION

1. Field of the Invention

The present invention relates to a horn switch assembly for vehicles, and more particularly to a horn switch assembly for vehicles wherein a horn switch is disposed between an airbag housing and an airbag cover so that only the airbag cover is supported by means of springs.

2. Description of the Related Art

Generally, a horn switch is a device that is on/off by a manipulation of a driver for connecting an electricity source to a horn sounding an alarm or disconnecting the electricity source from the horn. The horn switch is mounted in a steering wheel together with a driver airbag module.

FIG. 1 is an exploded perspective view showing a conventional horn switch assembly for vehicles, and FIG. 2 is a side view showing the conventional horn switch assembly for vehicles.

As shown in FIGS. 1 and 2, the conventional horn switch assembly for vehicles comprises: a horn plate 2 disposed under an airbag module 10 vertically slidably attached to a steering wheel, the horn plate 2 being attached to a hub of the steering wheel by means of bolts; a plurality of studs 4 each of which has one end attached to the horn plate 2 and the other end fitted in the airbag module 10; a plurality of coil springs 6 each of which is vertically wound on the circumference of the corresponding stud 4 for upwardly supporting the airbag module 10; a plurality of stationary terminals 7 mounted to the horn plate 2; and a plurality of movable terminals 8 mounted to the airbag module 10, the movable terminals 8 being connected to or disconnected from the stationary terminals 7, respectively, by means of a vertical sliding movement of the airbag module 10.

Each of the coil springs 6 has a prescribed elastic force so that the coil springs 6 are easily compressed when a driver pushes down the airbag module 10 while the coil springs 6 upwardly support the airbag module 10 so that the movable terminals are vertically spaced apart from the stationary terminals 7, respectively.

The operation of the conventional horn switch assembly for vehicles with the above-stated construction will now be described.

When the driver pushes down the airbag module 10 in the direction indicated by an arrow F in FIG. 2, the airbag module 10 is moved downward toward the horn plate 2 against the elastic force of the coil springs 6. As a result, the movable terminals 8 make contact with the stationary terminals 7, respectively, so that the horn is energized to sound an alarm.

After the driver stops pushing down the airbag module 10, the airbag module 10 is moved upward by virtue of the elastic force of the coil springs 6. As a result, the movable terminals are vertically spaced apart from the stationary terminals 7, respectively, so that the horn is no longer energized. Consequently, no alarm is sounded from the horn.

In the conventional horn switch assembly for vehicles, it is required that each of the coil springs 6 have high rigidity because the coil spring 6 must support the airbag module 10. However, space for the hub of the steering wheel is very limited, and thus design of the horn switch assembly is restricted due to its interference with the hub of the steering wheel and with the airbag module 10.

Furthermore, the force necessary to manipulate the horn switch is increased as the rigidity of the coil springs 6 is increased, which may bring about consumer dissatisfaction.

In the conventional horn switch assembly for vehicles, the horn plate 2 is attached to the steering wheel by means of the bolts after the studs 4, the coil springs 6, and the stationary terminals 7 are mounted to the horn plate 2. In case of the airbag module 10 comprising an airbag cover 12 and an airbag housing 14, the airbag cover 12 is attached to the airbag housing 14, the airbag cover 12 is attached to the airbag housing 14 by means of bolts so that the airbag cover 12 is moved simultaneously with the airbag housing 14. Consequently, the assembly operation of the conventional horn switch assembly for vehicles is very complicated.

Moreover, the airbag module 10 is mounted in the steering wheel together with the horn switch. Consequently, design of the airbag module 10 may be restricted due to the rigidity of the coil springs 6.

SUMMARY OF THE INVENTION

Therefore, the present invention has been made in view of the above problems, and it is an object of the present invention to provide a horn switch assembly for vehicles which is capable of reducing interference with a steering wheel and with an airbag module, simplifying an assembly structure of the airbag module, and decreasing a force necessary to manipulate a horn switch.

In accordance with the present invention, the above and other objects can be accomplished by the provision of a horn switch assembly for vehicles, comprising: an airbag housing and an airbag cover slidably attached to the airbag housing; at least one stud mounted in the airbag housing; a horn plate fitted on the circumference of the stud and moving along with the airbag cover; at least one elastic member disposed between the horn plate and the airbag housing for upwardly supporting the horn plate toward the airbag cover; and switch terminals mounted to the horn plate and the airbag housing, respectively, so that the switch terminals are connected to or disconnected from each other when the airbag cover is moved in a sliding fashion.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
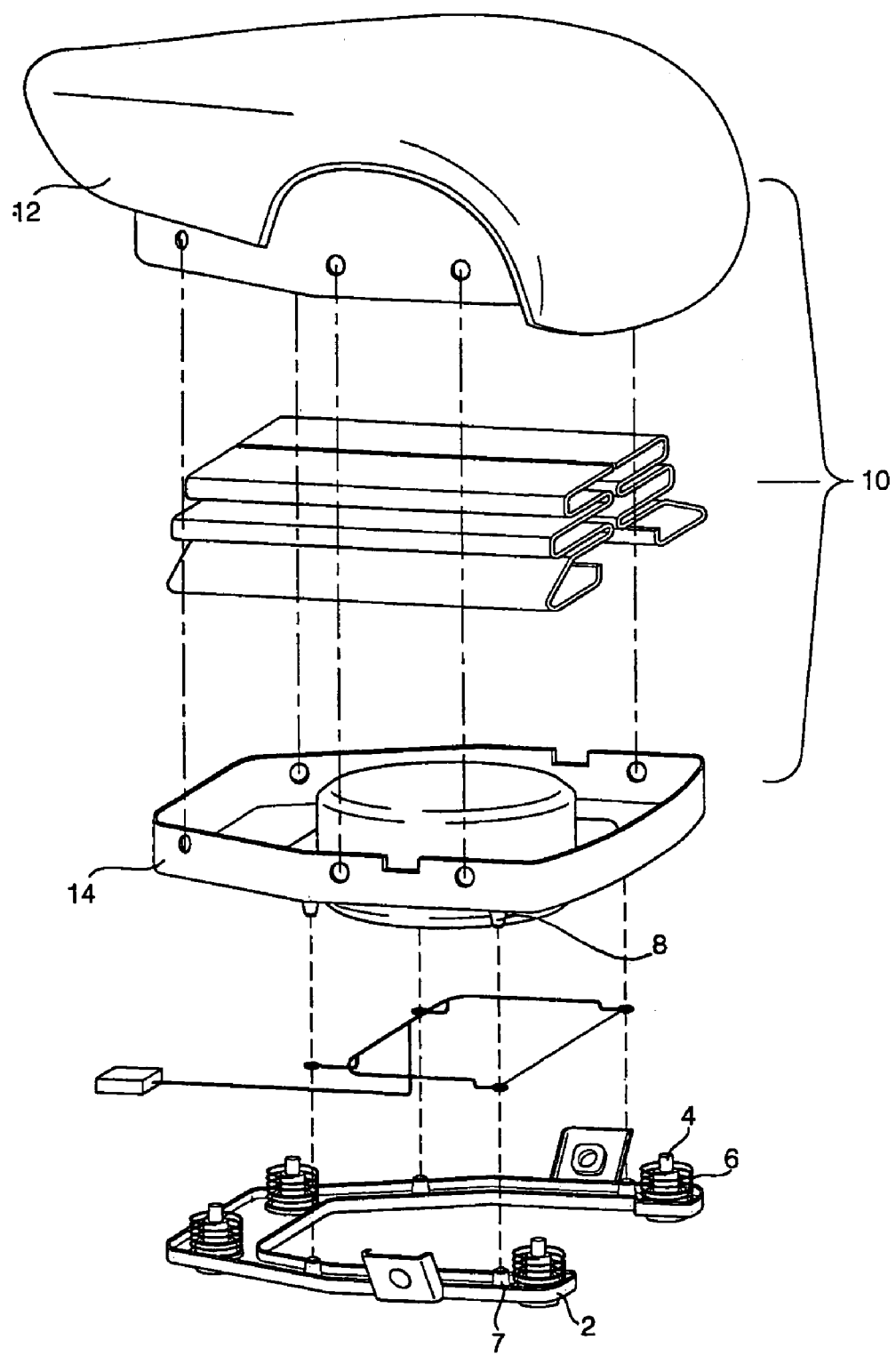
FIG. 1 is an exploded perspective view showing a conventional horn switch assembly for vehicles.
Figure 2:
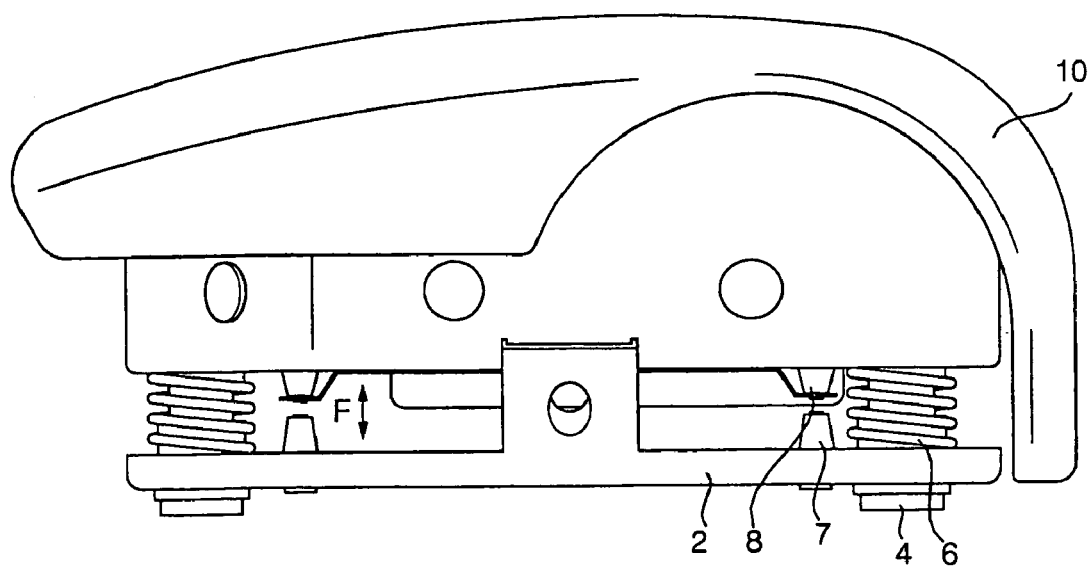
FIG. 2 is a side view showing the conventional horn switch assembly for vehicles.
Figure 3:
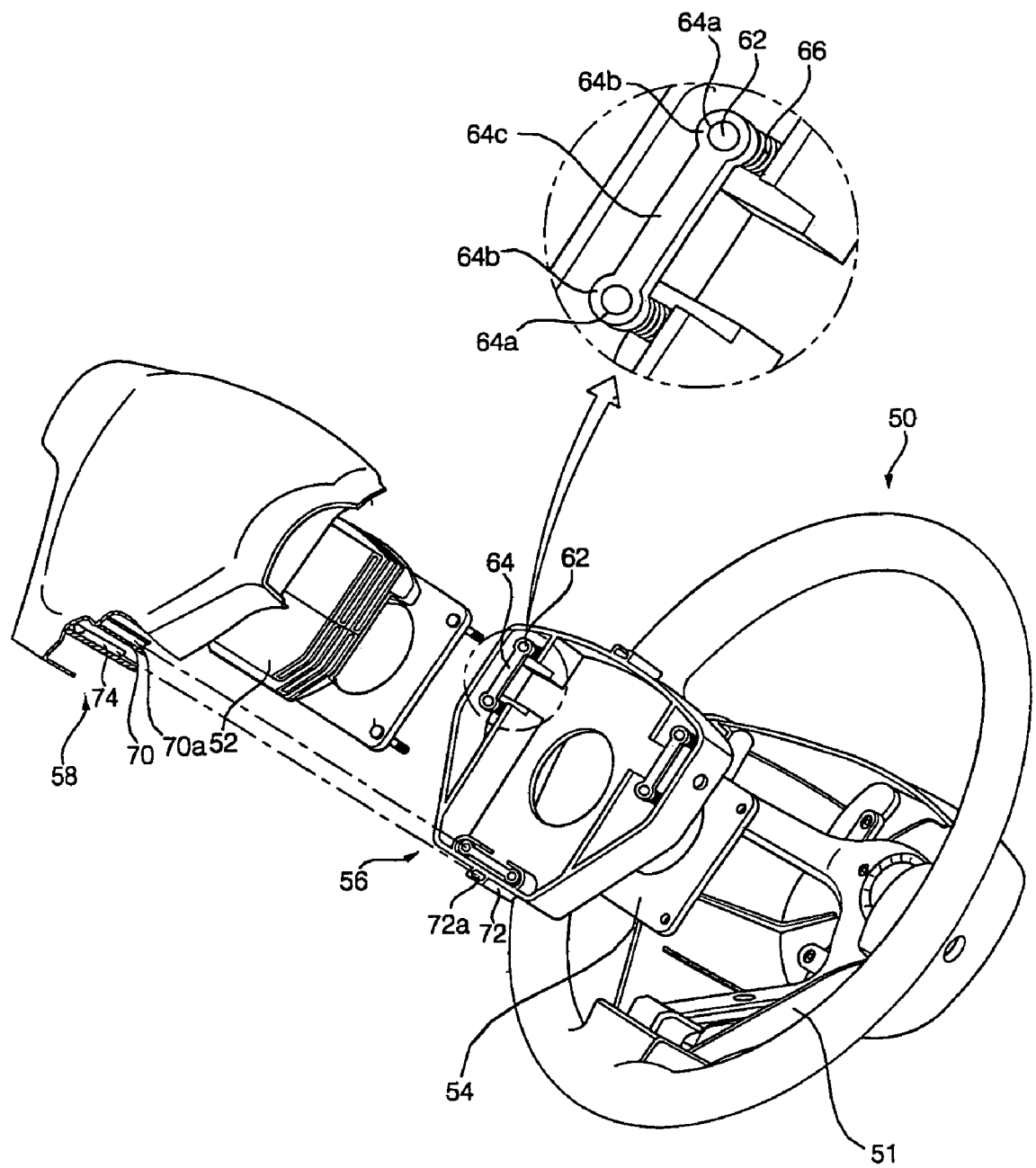
FIG. 3 is an exploded perspective view showing a horn switch assembly for vehicles according to a preferred embodiment of the present invention.
Figure 4:
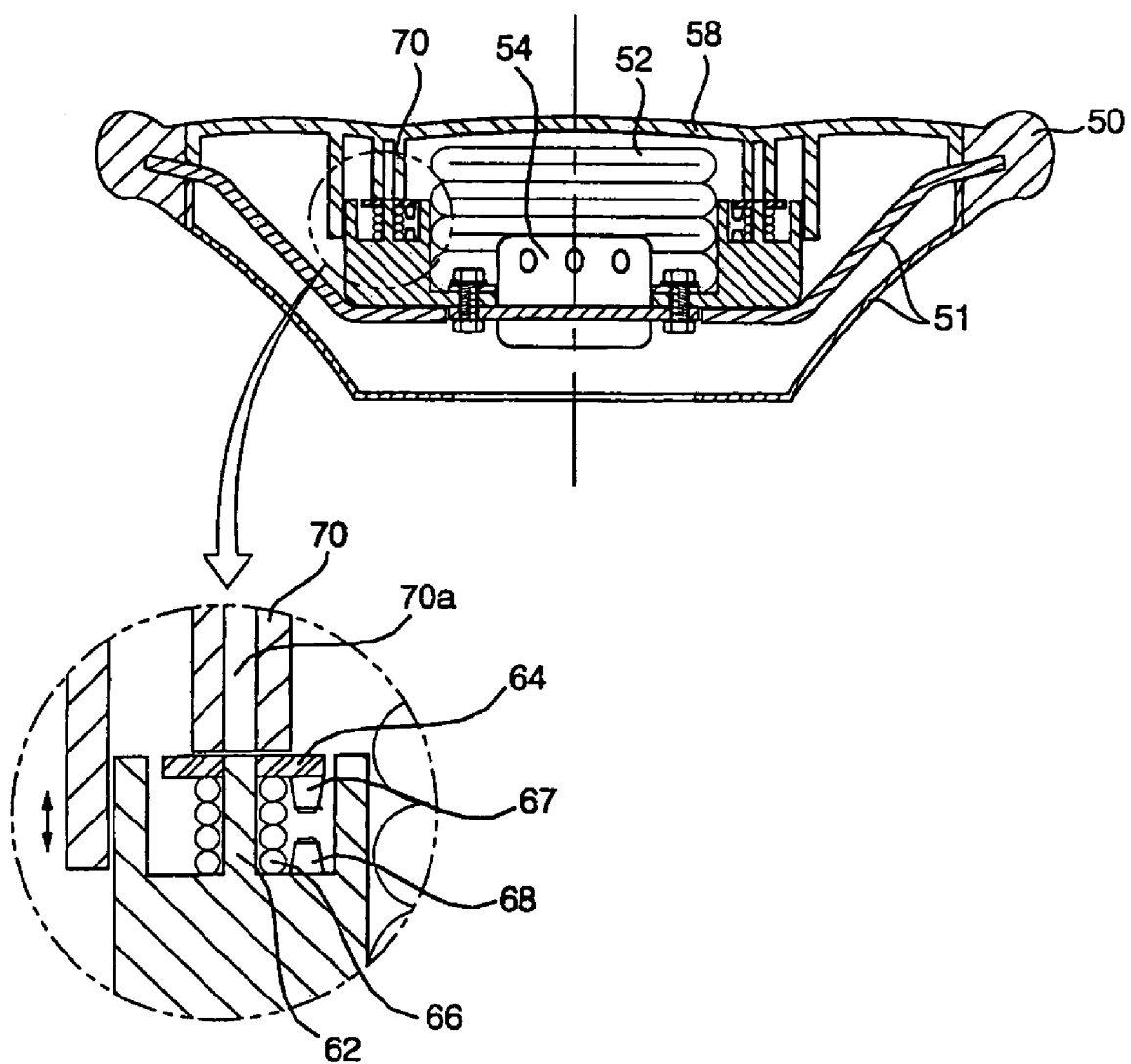
FIG. 4 is a side view, in section, showing the horn switch assembly for vehicles according to the preferred embodiment of the present invention.

FIG. 3 is an exploded perspective view showing a horn switch assembly for vehicles according to a preferred embodiment of the present invention, and FIG. 4 is a side view, in section, showing the horn switch assembly for vehicles according to the preferred embodiment of the present invention.

As shown in FIGS. 3 and 4, the horn switch assembly of the present invention is disposed between an airbag housing 56, which is mounted in a steering wheel 50 and accommodates an airbag 52 and an inflator 54, and an airbag cover 58, which is vertically slidably attached to the airbag housing 56. The horn switch assembly is on/off when the airbag cover 58 is slidably moved downward/upward.

The airbag housing 56 has a top open part and a bottom part, at which the airbag housing 56 is fixed to a hub 51 of the steering wheel 50 by means of bolts.

The horn switch assembly of the present invention comprises: studs 62 upwardly protruded from the bottom part of the airbag housing 56; a horn plate 64 fitted on the circumferences of the studs 62 and moving along with the airbag cover 58; elastic members 66 disposed between the horn plate 64 and the airbag housing 56 for upwardly supporting the horn plate 64 and the airbag cover 58; and a switch terminal unit comprising a movable switch terminal 67 attached to the horn plate 64 in such a manner that the movable switch terminal 67 is downwardly protruded from the horn plate 64, and a stationary switch terminal 68 attached to the airbag housing 56 in such a manner that the stationary switch terminal 68 is upwardly protruded from the airbag housing 56. The movable switch terminal 67 is connected to or disconnected from the stationary switch terminal 68 when the airbag cover 58 is moved downward or upward.

Each of the studs 62 is formed in the shape of a round bar. One of the studs 62 is spaced a predetermined distance from the other of the studs 62 along the edge of the airbag housing 56. The horn plate 64 is fitted on the circumferences of the studs 62 in a pair.

The horn plate 64 comprises: a pair of eye ends 64*b* having stud holes 64*a* formed therein, through which the pair of studs 62 pass, respectively; and a bridge 64*c* connected between the eye ends 64*b*. The width of the bridge 64*c* is smaller than the diameter of each of the eye ends 64*b*.

To the horn plate 64 are connected plungers 70, which are vertically protruded from the airbag cover 58 toward the horn plate 64, so that the horn plate 64 is slidably moved along with the airbag cover 58.

Each of the plungers 70 is protruded with the length corresponding to the distance between the airbag cover 58 and the horn plate 64 so that the plungers 70 are placed on the horn plate 64. Also, the plungers 70 have insertion holes 70*a* formed therein, respectively, into which the corresponding studs 62 are inserted when the airbag cover 58 is moved downward. Consequently, the plungers 70 do not make contact with the studs, respectively, when the airbag cover 58 is moved downward although the plungers 70 and the studs 62 are vertically arranged in such a manner that one of the plungers 70 and the corresponding stud are disposed in a line.

Preferably, each of the elastic members 66 is a coil spring vertically wound on the circumference of each of the studs 62, which has one end fixed to the bottom part of the airbag housing 56 and the other end fixed to the bottom surface of the horn plate 64. The elastic members are put on the circumferences of the studs 62 in a pair so that the horn plate 64 is securely and reliably supported by the pair of elastic members.

It should be noted that the airbag cover 58 is formed of a plastic material so that it is easily broken when the airbag 52 is expanded. Consequently, the airbag cover 58 is relatively light, and thus the elastic members can be miniaturized as compared to the conventional art.

It has been described above that there is provided a single horn switch assembly of the present invention primarily comprising a pair of studs 62 which are arranged along the edge of the airbag housing 56 while they are spaced apart from each other, a horn plate 64 fitted on the circumferences of the pair of studs 62, and a pair of elastic members 66 positioned on the circumferences of the pair of studs 62, respectively. It is most preferable, however, that a plurality of horn switch assemblies arranged along the edge of the airbag housing 56 are provided to uniformly support the airbag cover 58.

The studs 62 may be formed with prescribed different heights so that the airbag cover 58 can be horizontally supported. Also, the elastic members 66 may be formed with different elastic forces.

The horn switch assembly of the present invention is mounted in the edge of the airbag housing 56, whereby the horn switch assembly does not interfere with the airbag 62 and the inflator 64 disposed inside the airbag housing 56.

When the movable switch terminal 67 and the stationary switch terminal 68 of the switch terminal unit are not arranged in a line, it may result in poor contact between the movable switch terminal 67 and the stationary switch terminal 68. In order to prevent such poor contact between the movable switch terminal 67 and the stationary switch terminal 68, the airbag housing 56 is provided at the outer side thereof with a guide rail 72 having a guide hole 72*a* vertically formed therein, and the airbag cover 58 is provided with a guide protrusion 74, which is vertically inserted into the guide hole 72*a* of the airbag housing 56. Consequently, the airbag cover 58 can be vertically moved in a sliding fashion without shaking.

The operation of the horn switch assembly for vehicles with the above-stated construction according to the preferred embodiment of the present invention will now be described.

When a driver puts his/her hand(s) on the airbag cover 58 and then pushes down it, the force applied to the airbag cover 58 is transmitted to the horn plate 64 via the plungers 70. As a result, the horn plate 64 is move downward along with the airbag cover 58, by which the movable switch terminal 67 makes contact with the stationary switch terminal 68 so that the horn is energized to sound an alarm.

When the driver stops pushing down the airbag cover 58, the airbag cover 58, the plungers 70, and the horn plate 64 are moved upward simultaneously by virtue of the elastic force of the elastic members 66. As a result, the movable switch terminal 67 is separated from the stationary switch terminal 68 so that the horn is no longer energized. Consequently, no alarm is sounded from the horn.

As apparent from the above description, the present invention provides a horn switch assembly for vehicles which can be disposed between an airbag housing and an airbag cover vertically slidably attached to the airbag housing so that the horn switch assembly is protected by an airbag module comprising the airbag housing and the airbag cover, whereby its durability is increased. The horn switch assembly of the present invention can be miniaturized since elastic members are only support the airbag cover, which is made of a light material, whereby design of the horn switch assembly is not restricted. Also, the present invention has the effects of preventing interference between the horn switch assembly and the airbag module and between the horn switch assembly and a steering wheel, and the force necessary to manipulate the horn switch is also decreased.

Furthermore, the assembly of the present invention is accomplished by putting the elastic members on the circumferences of studs, respectively, fitting the horn plate on the circumferences of the studs, and inserting a guide protrusion of the airbag cover into a guide rail of the airbag housing, whereby the assembly operation of the horn switch assembly is simplified.

Besides, the present invention has further effects that the airbag housing is fixed to a hub of the steering wheel and the airbag cover is securely supported by means of the elastic members since the horn switch assembly is mounted in the airbag module, whereby the assembly structure of the airbag module is stable.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A horn switch assembly for vehicles, comprising:
    a steering wheel including a hub and spokes;
    an airbag housing attached to the steering wheel and an airbag cover slidably attached to the airbag housing;
    at least one stud mounted in the airbag housing;
    a horn plate fitted on the circumference of the at least one stud and moving along with the airbag cover, the horn plate including a pair of eye ends having stud holes and a bridge connected between the eye ends;
    at least one elastic member disposed between the horn plate and the airbag housing to upwardly support the horn plate toward the airbag cover; and
    switch terminals mounted to the horn plate and the airbag housing, respectively, so that the switch terminals are connected to or disconnected from each other when the airbag cover is moved in a sliding fashion.

2. The assembly as set forth in claim 1, wherein the airbag cover is attached to a hub of a steering wheel of bolts.

3. The assembly as set forth in claim 1,
    wherein the airbag housing is provided at the outer side thereof with a guide rail for guiding the sliding movement of the airbag cover, and
    wherein the airbag cover is provided with a guide protrusion, the guide protrusion being slidably inserted into the guide rail of the airbag housing.

4. The assembly as set forth in claim 1, wherein the at least one stud comprises a plurality of studs, arranged along the edge of the airbag housing, and wherein the horn plate elastically supported by the elastic member is fitted on the circumference of each of the plurality of studs so that the airbag cover is uniformly supported.

5. The assembly as set forth in claim 4, wherein the plurality of studs are formed with prescribed different heights so that the airbag cover is horizontally supported.

6. The assembly as set forth in claim 1, wherein the at least one stud is mounted in the edge of the airbag housing so that the at least one stud does not interfere with an airbag and an inflator disposed inside the airbag housing.

7. The assembly as set forth in claim 1, further comprising at least one plunger protruded from the airbag cover toward the horn plate, the at least one plunger being connected to the horn plate so that the horn plate is slidably moved along with the airbag cover.

8. The assembly as set forth in claim 7, wherein the at least one plunger has an insertion hole opened in the sliding direction of the airbag cover, the at least one stud being inserted into the insertion hole of the at least one plunger when the airbag cover is slidably moved to cause the switch terminals to contact each other.

9. The assembly as set forth in claim 1, wherein the horn plate has a pair of stud holes formed therein, and the at least one stud comprises a plurality of studs, each stud passing through a corresponding stud hole so that the horn plate is fitted on the circumferences of the plurality of studs.

10. The assembly as set forth in claim 1, wherein the elastic member is a coil spring wound on the circumference of the at least one stud, the coil spring having one end fixed to the airbag housing and the other end fixed to the bottom surface of the horn plate.

* * * * *